(12) United States Patent
Malitourne et al.

(10) Patent No.: US 10,273,981 B2
(45) Date of Patent: Apr. 30, 2019

(54) MASTER CYLINDER WITH GUIDE SLEEVE FOR A SEALING LIP OF THE SNIFTER SYSTEM

(71) Applicant: Schaeffler Technologies AG & Co. KG, Herzogenaurach (DE)

(72) Inventors: Jerome Malitourne, Drusenheim (FR); Laszlo Man, Ottersweier-Unzhurst (DE)

(73) Assignee: Schaeffler Technologies AG & Co. KG, Herzogenaurach (JP)

(*) Notice: Subject to any disclaimer, the term of this patent is extended or adjusted under 35 U.S.C. 154(b) by 278 days.

(21) Appl. No.: 15/329,085

(22) PCT Filed: Jul. 24, 2015

(86) PCT No.: PCT/DE2015/200420
§ 371 (c)(1),
(2) Date: Jan. 25, 2017

(87) PCT Pub. No.: WO2016/019960
PCT Pub. Date: Feb. 11, 2016

(65) Prior Publication Data
US 2017/0211596 A1    Jul. 27, 2017

(30) Foreign Application Priority Data
Aug. 6, 2014  (DE) .................. 10 2014 215 518

(51) Int. Cl.
*F15B 7/08*       (2006.01)
*B60T 11/236*   (2006.01)
(Continued)

(52) U.S. Cl.
CPC .............. *F15B 7/08* (2013.01); *B60T 11/236* (2013.01); *F16D 25/088* (2013.01); *F16D 25/12* (2013.01);
(Continued)

(58) Field of Classification Search
CPC ........ F15B 7/08; B60T 11/236; F16D 25/088; F16D 25/12; F16D 25/08; F16D 25/083; F16D 25/2252; F16D 29/005
(Continued)

(56) References Cited

U.S. PATENT DOCUMENTS 3,802,199 A * 4/1974 Hagberg, Jr. ......... B60T 11/165
                                                            60/574
4,162,616 A * 7/1979 Hayashida ............. B60T 11/22
                                                            60/533
(Continued)

FOREIGN PATENT DOCUMENTS

DE          29516488          12/1995
DE          19915832           7/2000
(Continued)

*Primary Examiner* — Thomas E Lazo
*Assistant Examiner* — Richard C Drake
(74) *Attorney, Agent, or Firm* — Volpe and Koenig, P.C.

(57) ABSTRACT

The invention relates to a master cylinder for an actuating device of a clutch or a brake of a motor vehicle, including a cylinder housing having a pressure cylinder section, as well as a piston mounted movable relative to the cylinder housing, wherein the piston is arranged inside the pressure cylinder section in an actuation state in order to control a fluid pressure in a fluidically sealed pressure chamber by a sealing device on the piston side, and is arranged in a pressureless state such that the pressure cylinder section is fluidically connected to a retention system, wherein a seal of the sealing device is configured, and attached to the piston, such that it rests on a seal protection area of a stop element at least in a parking position in the pressureless state; as well as a method for mounting such a master cylinder.

10 Claims, 4 Drawing Sheets

(51) Int. Cl.
*F16D 25/08* (2006.01)
*F16D 25/12* (2006.01)

(52) U.S. Cl.
CPC .... *F16D 2025/081* (2013.01); *F16D 2300/08* (2013.01)

(58) Field of Classification Search
USPC .......................................................... 60/533
See application file for complete search history.

(56) References Cited

U.S. PATENT DOCUMENTS

| | | | | |
|---|---|---|---|---|
| 4,598,955 A * | 7/1986 | Belart | ...................... | B60T 13/12 303/114.1 |
| 4,745,751 A * | 5/1988 | Gaiser | ................... | B60T 11/224 60/578 |
| 4,781,024 A * | 11/1988 | Nakamura | ............ | B60T 11/236 277/558 |
| 4,922,120 A * | 5/1990 | Becker | ...................... | B60T 8/38 188/359 |
| 5,161,376 A * | 11/1992 | Hartmann | ................ | B60T 11/20 60/562 |
| 5,327,723 A * | 7/1994 | Fulmer | ................... | B60T 11/20 60/562 |
| 5,647,213 A * | 7/1997 | Kaub | ...................... | B60T 11/20 60/578 |
| 5,732,557 A * | 3/1998 | Sacristan | ................. | B60T 11/20 60/562 |
| 5,987,887 A * | 11/1999 | Prosch | .................... | B60T 11/16 60/533 |
| 7,216,752 B2 * | 5/2007 | Derra | .................... | F16D 25/088 192/85.59 |
| 2002/0020291 A1* | 2/2002 | Keller | ..................... | B60T 11/16 92/261 |
| 2002/0124562 A1* | 9/2002 | Ishiwata | ................. | B60T 11/20 60/562 |
| 2004/0055296 A1* | 3/2004 | Leboisne | ................ | B60T 11/22 60/533 |
| 2004/0168439 A1* | 9/2004 | Welter | ................... | F15B 21/008 60/533 |
| 2005/0138927 A1* | 6/2005 | Arrigoni | ............... | B60T 11/224 60/533 |
| 2005/0279173 A1 | 12/2005 | Leigh-Monstevens | | |
| 2012/0110994 A1* | 5/2012 | Chen | ..................... | B60T 11/232 60/533 |
| 2014/0060037 A1* | 3/2014 | Lhuillier | ................ | B60T 11/232 60/533 |

FOREIGN PATENT DOCUMENTS

| | | | | |
|---|---|---|---|---|
| DE | 10242841 | | 4/2003 | |
| DE | 102013204561 | | 10/2013 | |
| EP | 1790860 | | 5/2007 | |
| WO | WO-2015149777 A1 * | 10/2015 | ........... | F16D 25/088 |

* cited by examiner

MASTER CYLINDER WITH GUIDE SLEEVE FOR A SEALING LIP OF THE SNIFTER SYSTEM

BACKGROUND

The invention relates to a (preferably hydraulic) master cylinder for an actuating device of a clutch or a brake of a motor vehicle, such as a car, truck, bus, or agricultural utility vehicle, comprising a cylinder housing having a pressure cylinder section, as well as a piston movably provided in reference to the cylinder housing, with the piston being arranged in the actuated state within the pressure cylinder section in order by a piston to control a fluid pressure in a pressure chamber, fluidically sealed via a sealing device, and being arranged in a pressureless state such that the pressure cylinder section is fluidically connected to a retention system.

Generic master cylinders as well as actuating devices are known from prior art in various embodiments, with for example DE 10 2013 204 561 A1 disclosing a sealing arrangement, particularly a piston cylinder unit. The sealing arrangement comprises an annular seal with a static sealing lip and a dynamic sealing lip, which are connected to each other, with the seal being provided in a seat which has at least one circumferential wall and at least one axial wall. The seal rests here with the static sealing lip radially at the circumferential wall, with the dynamic sealing lip contacting another wall abutting the seat, being dynamically supported. The additional wall has in an axial section a plurality of axial grooves, provided distributed in the circumferential direction, and the dynamic sealing lip has in an axial section of its extension a plurality of axial grooves, provided distributed in the circumferential direction. The axial grooves of the dynamic sealing lip are connected to each other via a circumferential groove.

However it has been shown in these embodiments known from prior art that in case of an extended contact of the respective sealing lip/seal in the groove area, for example in a parking position in which the seal is located in a shut-off state of the master cylinder, disadvantageously a lasting deformation of the sealing lip can occur due to the environmental circumstances; because when the sealing lip, for example in a parking position, at relatively low ambient temperatures abuts an uneven area over an extended period of time, here a deformation of the sealing contour can occur at the seal. When the master cylinder is actuated anew the cold sealing lips can then remain deformed, at least partially and over a first period of time, resulting in the master cylinder exhibiting strong leakage. A reliable function of the master cylinder is then no longer ensured under such circumstances.

It is further disadvantageous in the embodiments known from prior art that the seals/sealing devices require a relatively expensive assembly. Here, particularly when inserting the piston into the cylinder housing, the seals may be subjected to excessive mechanic stress, which can even lead to an abrasion of material at the seals. This would lead to a defect of the respective seat.

SUMMARY

The objective of the present invention is to correct the disadvantages known from prior art and to provide a master cylinder in which operation free from leakage shall be ensured even after an extended downtime of the motor vehicle and simultaneously an uncomplicated and reliable assembly of the sealing device shall be obtained.

This objective is attained according to the invention in that the seal of the sealing device is embodied and arranged at the piston such that at least in a parking position, in the pressureless state, it contacts a seal protecting section of a stop element.

This way it is possible to fasten the seal responsible for sealing the pressure cylinder section directly at the piston and to connect said piston to the respective stop element already before inserting it into the cylinder housing. Subsequently the stop element only needs to be fastened to the cylinder housing, with a protected contacting of the seal at the seal protecting section. This allows a particularly gentle assembly of the seal, with simultaneously in the respective parking position the seal contacting in the protecting section allowing any unintentional deformation of the seal to be prevented.

Other advantageous embodiments are claimed in the dependent claims and explained in greater detail in the following.

According to another embodiment it is advantageous for the piston to be arranged in a pressureless state outside the pressure cylinder section. The pressure cylinder section represents here preferably the section of the cylinder housing, which shows a homogenous section extending in a cylindrical fashion. The pressure cylinder section is preferably embodied circularly. This way a particularly effective ability for shifting the master cylinder is implemented.

If the stop element is furthermore embodied as a part separated from the cylinder housing (separated from the material thereof) the stop element can be produced in a particularly cost-effective fashion.

In this context it is also beneficial for the stop element to be embodied as a cold formed, for example deep-drawn part. Further preferred, the stop element is formed like a cup/sheath. This way an even more cost-effective production is possible.

If the stop element forms the seal protecting section at an internal circumferential area, with the internal circumferential area showing a first diameter, constant over the circumference in the area of the seal protecting section, the seal protecting section can be produced in a particularly simple fashion. Thereby the production of the master cylinder is further promoted.

If the first diameter of the seal protecting section is greater than a second diameter of the pressure cylinder section the seal of the sealing device can slightly relax in the parking position inside the stop element and thus slightly expand in the radial direction such that this way the trend to leak is further minimized.

If the cylinder housing advantageously comprises a transitional section, expanding in the axial direction of the stop element chronically away from the pressure cylinder section and showing several radial grooves connected to the retention system, this way a snifter operation can also be implemented easily with this master cylinder in which it is not required to completely retract the piston into the parking position in order to compensation pressure peaks. This renders the master cylinder to be particularly powerful.

It is furthermore advantageous for the seal to be embodied in an annular fashion, with a sealing lip of the seal being embodied such that it can be made to contact the seal protecting section as well as the pressure cylinder section. This sealing lip is preferably in contact with the sealing protecting section, at least in the parking position/in the pressureless state, as well as in contact with the pressure cylinder section in the actuated state. This way a particularly efficient seal is implemented.

It is also beneficial for the stop element to show a retention system embodied at a radial exterior side, formed like a clamp, which in the operating state is inserted into a receptacle of the cylinder housing in a radially fixed but axially displaceable fashion. This allows a particularly simple fastening of the stop element and further facilitates the assembly.

If the stop element is pre-stressed via a disk spring in the direction of the pressure cylinder section, the approaching to the reference point is also easily possible. Here the disk spring is preferably arranged such that the piston can be pulled from the parking position further away from the pressure cylinder section, which leads to a displacement of the stop element in the same direction. A reference point is then reached when the disk spring contacts a reference stop and is essentially located in a vertical alignment. In this reference point the stop element is always held by the restraint system still in the radial direction in the cylinder housing. Further preferred, the displacement path of the piston is calculated directly via a spindle, driving the piston, as a function of the rotations performed. This allows implementing a master cylinder in which a path sensor can be waived for determining the position of the piston. This way the master cylinder is embodied in a particularly cost-effective fashion. Consequently, when moving between a parking position and a reference position/a reference point the piston is located inside the stop element such that the seal contacts the seal protecting section during this motion.

Furthermore, the invention also relates to a method for assembling this master cylinder according to one of the above-mentioned embodiments, comprising at least the following steps performed successively:

Inserting the piston into the stop element such that the seal is inserted/positioned and contacts the seal protecting section in the stop element (being in the parking position), Inserting the stop element, receiving the piston, into a receptacle in the cylinder housing until the stop area of the stop element contacts the counter stop area of the cylinder housing, and Fastening at least one lid element at the cylinder housing with the stop element axially being pre-stressed in the direction of the pressure cylinder section.

This way the assembly of the master cylinder is embodied in a manner particularly gentle for the seal.

In other words, the present invention provides as a solution for any "freezing" the seal/the sealing lip of the seal at low temperatures that the sealing lip rests in the reference position and in the parking position respectively on an interior area of the cylinder free from grooves (seal protecting section). This interior area of the cylinder is provided by a sheath (stop element) comprising an internal diameter (first diameter) which is greater than the internal diameter (second diameter) of the pressure chamber of the pressure cylinder (pressure cylinder section). This way even for a "frozen" position here a respective compression for sealing is ensured when pressure develops. In the proximity of the snifter groove (radial groove) of the housing/cylinder housing of the pressure cylinder the seal leaves the sheath section (seal protecting section) and impinges the interior area of the housing (transition section). For this purpose the interior area of the housing is designed in a conical fashion, with a (third) diameter in the direction of the sheath/the stop element being greater than the internal diameter of the sheath. When the sealing lip is displaced in the area of the pressure cylinder here it contacts not any edge but rather a diagonal section which contracts slowly to the internal diameter of the cylinder/pressure cylinder section. This way damages can be avoided. The snifter apertures and perhaps also snifter grooves/radial grooves are provided in this conical section (transition section) of the cylinder housing of the pressure cylinder. The conical section may have centering elements by which the centering of the sheath with regards to the cylinder can be at least supported. The sheath/guide sheath is here embodied such that it cannot follow the feed of the piston in the conical section, but exhibits a pre-stressing which contacts a stop of the cylinder housing. Accordingly the sheath fulfills the dual function that it is designed in one piece and also represents the contact point of the piston to the disk spring in order to determine the reference point. The piston is here pressed against the reference stop with increased force in reference to the "normal force" for moving the piston without here the piston being pressed open or shut. The reference stop is here sized such that it can also bridge resistances in the spring section, which are caused for example by soiling. Other embodiments include forming the sheath as an additional reference stop and the embodiment towards the housing stop and the expansion and the conical form of the cylinder in the proximity of the snifter bore holes.

BRIEF DESCRIPTION OF THE DRAWINGS

In the following the invention is explained in greater detail based on figures.

Shown are.

The figures are only of a schematic nature and exclusively serve to explain the invention. Identical elements are marked with the same reference characters.

DETAILED DESCRIPTION OF THE PREFERRED EMBODIMENTS

Figure 1:
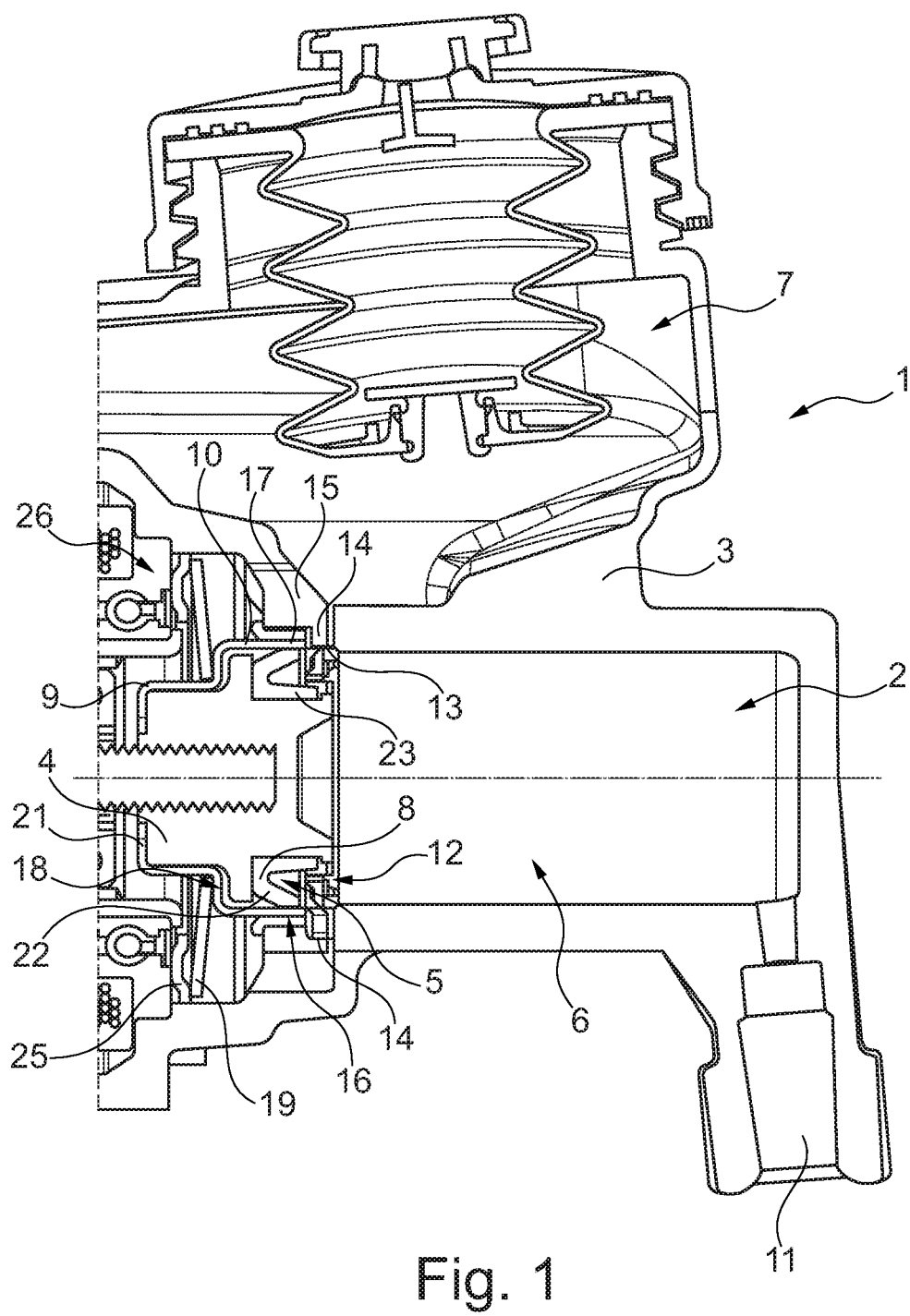
FIG. 1 a longitudinal cross-section of a master cylinder according to the invention in a first embodiment, with particularly the pressure cylinder section, the retention system, as well as the piston of the master cylinder cooperating with the pressure cylinder section being shown, FIG. 2 a detail of the longitudinal cross-section already shown in FIG. 1 in the proximity of the piston as well as the stop element, with the piston being in a parking position of the pressureless state and a transitional section being discernible, connecting the pressure cylinder section via radial grooves to the retention system, FIG. 3 a detailed longitudinal cross-section of the master cylinder in the proximity of the piston as well as the stop element similar to FIG. 2, with in FIG. 3 the piston as well as the stop element being sectioned in an area offset from the radial grooves, FIG. 4 an isometric illustration of the cylinder housing of the master cylinder in the proximity of the pressure cylinder section, with the transition section and its radial grooves being clearly discernible, FIG. 5 an isometric illustration of the stop element, with its longitudinal sectional area being indicated and shown from a side which in the operating state faces away from the pressure cylinder section, FIG. 6 a longitudinal cross-section of an assembly between the stop element and the piston and/or the piston head thereof, which accepts the seal of the sealing device, FIG. 7A a longitudinal cross-section of a master cylinder, with the section of the piston accepting the seal as well as the stop elements being shown, and with the piston including the stop element being displaced into a referencing position/reference position, FIG. 7B a longitudinal cross-section of the master cylinder according to FIG. 7A, with the piston including the stop element being in a parking position, FIG. 7C a longitudinal cross-section of the master cylinder according to FIGS. 7A and 7B, with the piston being displaced out of the stop element in the direction of the pressure cylinder section such that the seal with its external side contacts the pressure cylinder section with its exterior, at a snifter point, just before completely sealing it, but a fluidic connection is still given between the pressure cylinder section to the retention system, and FIG. 7D a longitudinal cross-section of the master cylinder, as already illustrated in FIGS. 7A to 7C, with the piston being in the actuating state in which it is inserted into the pressure cylinder section and the seal contacts the interior surface of the pressure cylinder section in a sealing fashion.

FIG. 1 shows in a clear fashion a first embodiment of the master cylinder 1 according to the invention. The master cylinder 1 is provided for the use in a hydraulic actuator device, not shown in greater detail for reasons of clarity, of a clutch in a drivetrain or in a brake of a motor vehicle. Preferably the master cylinder 1 is however embodied as a hydraulic master cylinder. The hydraulic master cylinder 1 is here preferably inserted as the actuating element in a hydraulic clutch actuator. Alternatively it is also possible though to insert the hydraulic master cylinder 1 in an actuating device, which is embodied as a modular clutch actuator. The master cylinder 1 is designed according to the so-called "snifter system".

The master cylinder 1 comprises a pressure cylinder section 2, which is arranged in a cylinder housing 3 of the master cylinder 1. The pressure cylinder section 2 is formed essentially circularly with regards to its cross-section and extends cylindrically. At a first axial end section the pressure cylinder section 2 comprises a connection 11, which connection 11 is hydraulically connected to the element of the actuating device respectively to be operated, for example a clutch actuator bearing (engagement or disengagement bearing) or a brake piston (in the operating state). At a second axial end section, which is located opposite the first axial end section, the pressure cylinder section 2 has an opening through which a piston 4 can be inserted into the pressure cylinder section 2.

The piston 4 (also called pressure piston) is supported in a displaceable fashion in the axial direction of the pressure cylinder section 2 in reference to the cylinder housing 3. The piston 4 is arranged coaxially in reference to the pressure cylinder section 2. The piston 4 is arranged in an operating state of the master cylinder 1 inside the pressure cylinder section 2, i.e. inserted in the pressure cylinder section 2. The piston 4 comprises a sealing device 5, which cooperates in the operating state with the pressure cylinder section 2 such that the piston 4 and the pressure cylinder section 2 form a sealed pressure chamber 6. As a function of the axial position/axial displacement position of the piston 4 within the pressure cylinder section 2 here the pressure is controlled inside the pressure chamber 6 and thus also in the proximity of the connection 11. In a pressureless state of the master cylinder 1 the piston 4 is placed in reference to/outside the pressure cylinder section 2 such that the pressure cylinder section 2 is connected fluidically to the restraint system 7 (also called restraint storage or reservoir) in a fluidic/hydraulic fashion. The sealing device 5 comprises a seal 8, which seal 8 is arranged in the axial direction/axially fixed to the piston 4. The piston 4 is here at least in a parking position of the master cylinder 1, in the pressureless state, inserted in a stop element 9, with the seal 8 contacting the seal protecting section 10.

It is furthermore clearly discernible in connection with FIGS. 2 and 3 that the pressure cylinder section 2 showing a circular cross-section (hereinafter called second diameter) transfers at its second axial end section into a transitional section 12. The transitional section 12 is embodied/connected integrally to the pressure cylinder 2. The transitional section 12 therefor follows in the axial direction to a side of the pressure cylinder section 2 facing away from the connection 11. The transitional section 12 comprises a conically extending internal circumferential side 13, which is enlarged in its diameter from the pressure cylinder section 2 in the axial direction away from the pressure cylinder section 2. The transitional section 12 therefore shows at the axial end, facing away from the pressure cylinder section 2, a third diameter which is greater than the second diameter.

Figure 4:
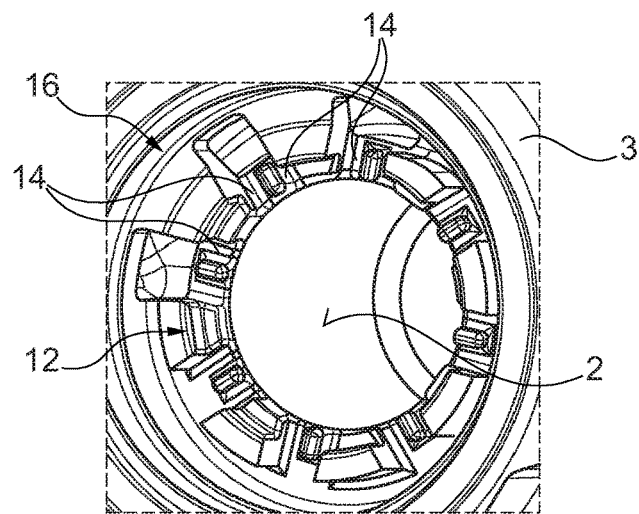

The embodiment of the transitional section 12 is particularly clearly discernible in FIG. 4. The transitional section 12 is essentially formed in a circular fashion. Several radial grooves 14 are inserted in the transitional section 12 at a front area facing away from the pressure cylinder section 2. Due to the fact that the transitional section 12 is embodied integrally with the pressure cylinder section 2, the radial grooves 14 are therefore inserted in the cylinder housing 3. The radial grooves 14 are open towards the interior circumference 13 and connect the radial interior of the transitional section hydraulically/fluidically to the retention system 7, which in turn is connected via at least one connection groove 15 to the radial grooves 14.

At the axial end of the transitional section 12, facing away from the pressure cylinder section 2, the transitional section 12 also extends essentially annularly and is embodied in the form of a facial groove. The receptacle 16 serves to accept the stop element 9. In the actuating state the stop element 9 is inserted into the receptacle 16 and contacts with an axial stop area directly a counter stop area of the transitional section 12. In this context FIG. 2 shows in a particularly illustrating fashion a parking position of the master cylinder 1, with the stop element 9 being formed via a clamp-like and annular restraint system 17, which is preferably formed by beading, inserted into the receptacle 16. The radial interior circumference of the receptacle 16 and the exterior circumference of the restraint system 17 abutting it are here with regards to their diameters adjusted to each other such that the stop element 9 is held in the radial direction in reference to the cylinder housing 3, however still allows displacement in the axial direction.

The stop element 9 (also called guide sheath), essentially embodied like a cup, further comprises a first step 18 extending in the radial direction, at which a disk spring 19 is arranged at the axial side, facing away from the pressure cylinder section 2, so that the stop element 9 is held in the cylinder housing 3 protected from getting lost. The seal protecting section 10 is formed directly by an interior circumferential area 20 of the stop element 9. The interior circumferential area 20 comprises a circular, planar/flat surface area. Additionally, the interior circumferential area 20 shows a diameter, namely a first diameter, which is also greater than the second diameter, i.e. the diameter of the pressure cylinder section 2. The first diameter is however embodied smaller than the third diameter. A second radial step 21, which is arranged radially inside the first radial step 18 as well as the interior circumferential area 20, is further provided for the purpose to serve as a stop for the piston 4. The second step 21 therefore prevents the piston 4 from being pulled out in the axial direction, away from the pressure cylinder section 2.

Figure 5:
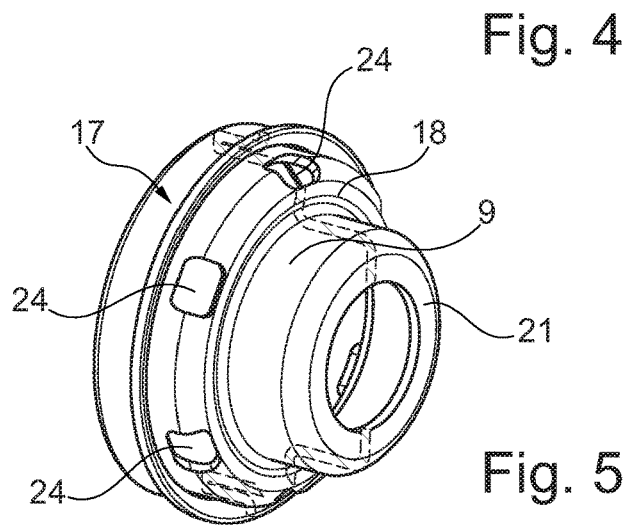
Figure 6:
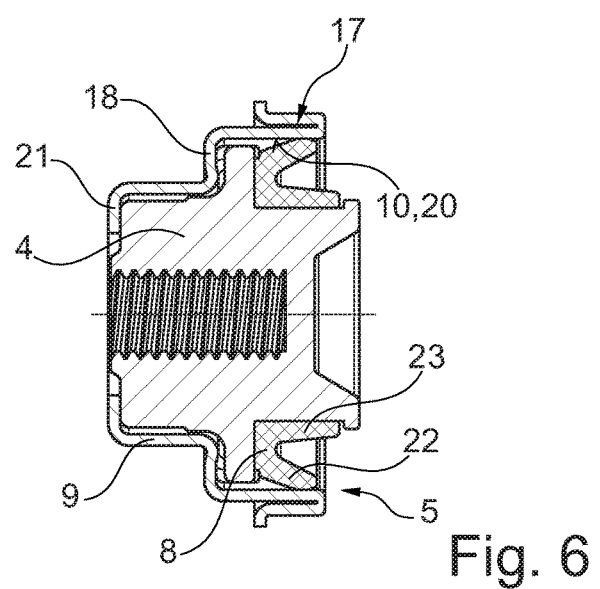

The further embodiment of the stop element 9 is particularly clearly discernible in FIGS. 5 and 6 as well. Here it is also clearly shown that the seal 8 is embodied as a lip seal and has the sealing lip 22, which when seen in the longitudinal cross-section extends from a base section 23 in the radial direction as well as the axial direction towards the pressure cylinder section 2. The base section 23 abuts flat along the circumference of an exterior of a piston head of the piston 4. The seal 8 is embodied continuously along the entire circumference, i.e. embodied in an annular fashion. The sealing lip 22 contacts in its parking position, as shown in FIG. 2, preferably at the seal protecting section 10. As furthermore clearly discernible in connection with FIG. 3 as well as in connection with FIG. 5 the stop element shows in a radial section between the retention system 17 and the second step 21 several compensation openings distributed evenly over the circumference in the form of penetrating bores, via which an additional pressure is released, which may develop perhaps behind the sealing lip 22, i.e. in an axial direction facing away from the pressure cylinder section 2.

Figure 7A:
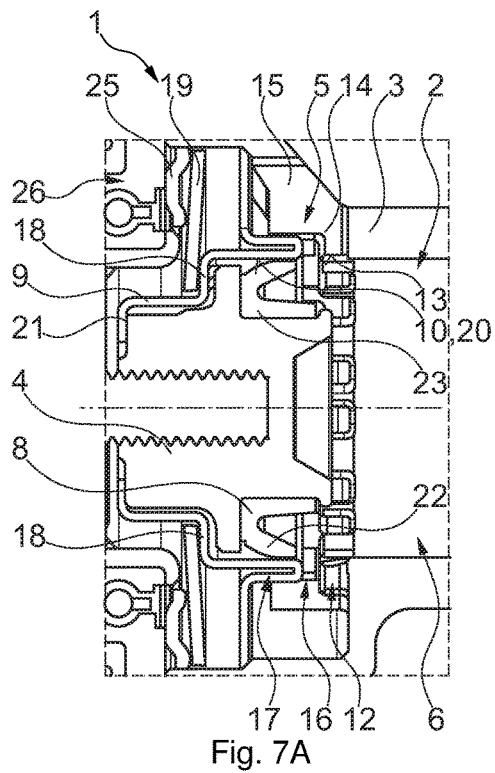

Furthermore, the various shifting states of the master cylinder 1 are shown in greater detail in connection with FIGS. 7A to 7D. The piston 4 is a part of a spindle drive, which is not shown in greater detail for reasons of clarity. Consequently a rotary motion of a spindle causes the axial displacement of the piston 4 in the direction of the pressure cylinder section 2, into it or out of it. FIG. 7A shows a reference position/referencing position of the master cylinder 1. In this reference position the piston 4 is retracted in the axial direction away from the pressure cylinder section 2 such that its disk spring 19 comes to contact a secondary reference stop 25. In this referencing point, based on the embodiment of the master cylinder 1 without a path sensor, the initial position of the piston 4 is metrologically checked such that it can be securely assumed that the piston 4 is positioned in the desired position in the further displacement range, in the pressureless state as well as the actuated state.

Figure 2:
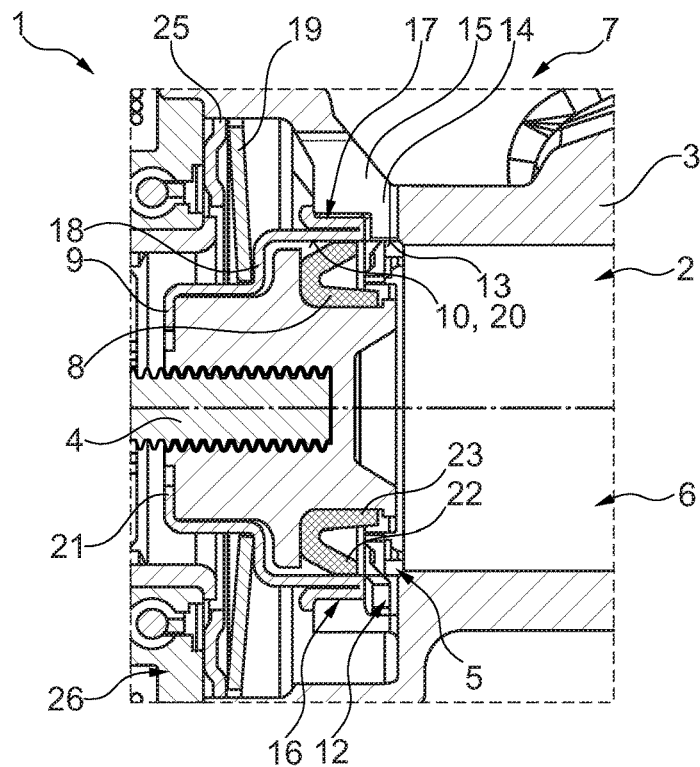
Figure 3:
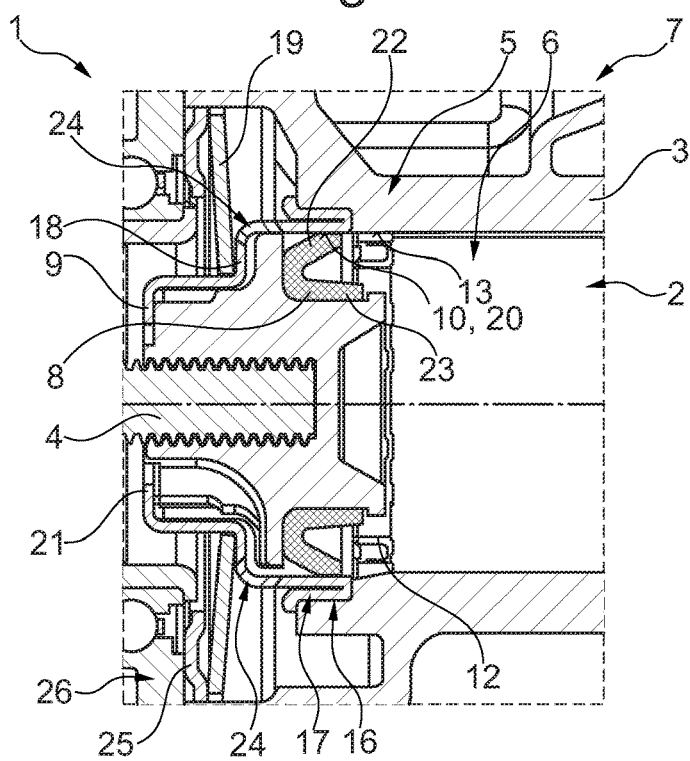
Figure 7B:
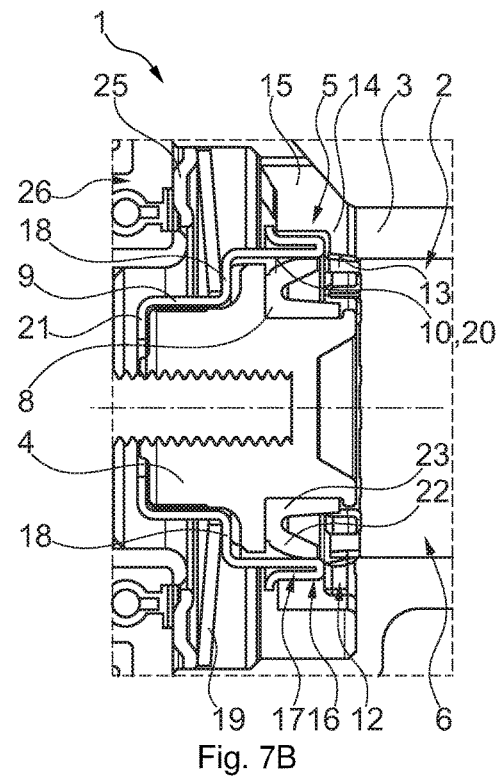

In this reference position, based on the stop of the disk spring 19 at the reference stop 25 and the axial displacement of the disk spring 19, the stop element 9 is slightly pulled out of the receptacle 16 in reference to the parking position according to FIGS. 2 and 7B, however still guided in the radial direction in the receptacle 16. After the metrological detection/determination/checking of the reference position/referencing position a start position is allocated to the piston 4, from which the piston 4 then is moved back into the parking position according to FIG. 7B. In the parking position the retention system 17 contacts with its axial face (also called contact area), facing the pressure cylinder section 2, in the axial direction the receptacle 16 (also called counter contact area). In this parking position once more the axial support of the stop element 9 and the spring-elastic pre-stressing in the direction of the pressure cylinder section 2 is provided via the disk spring 19.

Figure 7C:
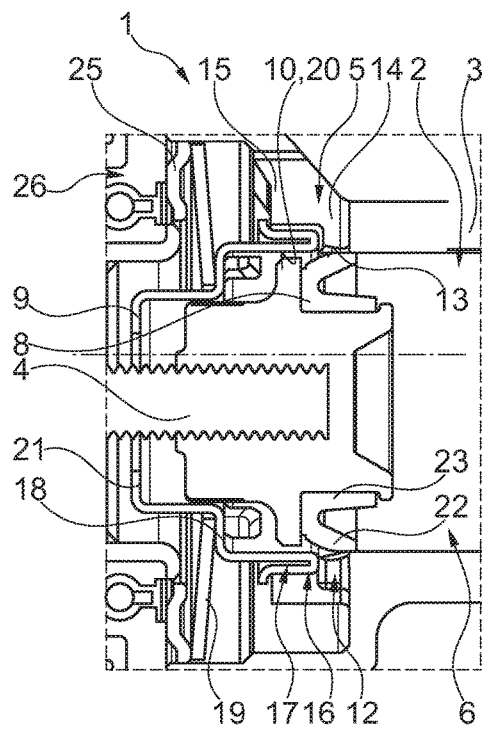
Figure 7D:
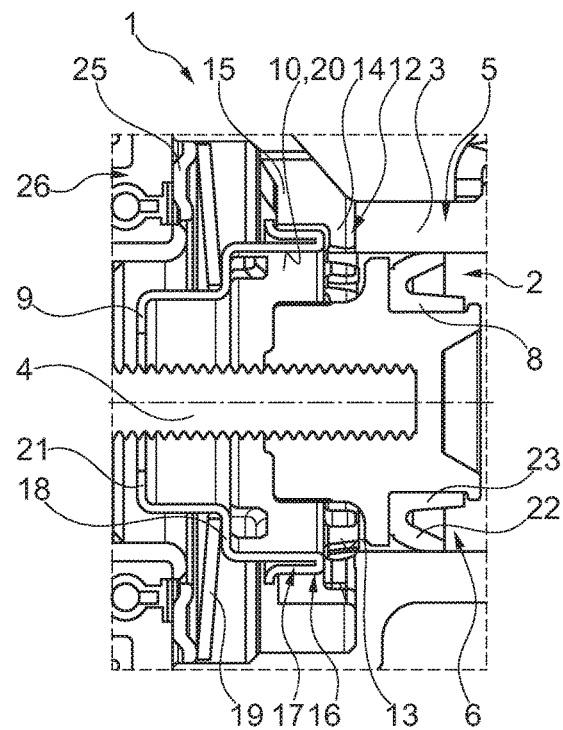

Finally, if the pressure chamber 6 shall be impinged with a certain hydraulic pressure in order to actuate a clutch or a brake, according to FIG. 7C the piston 4 is inserted into the pressure cylinder section 2. Due to the fact that the first diameter is smaller than the third diameter and the interior circumference 13 of the transitional section 12 extends in a conically tapering fashion from the receptacle 16 to the pressure cylinder section 2, the sealing lip 22 is particularly carefully inserted into the pressure cylinder section 2 with the axial motion in the pressure cylinder section 2. By a sealing contact of the sealing lip 22 at the pressure cylinder section 2, according to FIG. 7D further any arbitrary pressure can be generated in the pressure chamber 6. If during operation, for example due to temperature fluctuations, undesired pressure peaks develop, the piston 4 is again via the drive withdrawn from the pressure cylinder section 2 to such an extent that the sealing lip 22 contacts in a so-called snifter point at the level of the transitional section 12 according to FIG. 7C. In this snifter point it is ensured that the sealing lip 22 is still essentially contacting/compressed on the radial level of the second diameter, however a brief opening of the pressure chamber 6 to the restraint reservoir 7 is ensured via the radial grooves 14. This way brief pressure compensation can occur. If finally the actuating process is completed, the piston 4 is once more brought into the pressureless state, with the pressureless state representing the state in which the pressure cylinder section essentially shows the same pressure as the retention system. The parking position in this pressureless state (see FIG. 7B) shows the piston 4 in the pushed-back state.

Based on the improved design of the stop element 9 as well as the piston 4 including the sealing device 5 the assembly of the master cylinder 1 is also possible in a particularly simple fashion. For this purpose, as clearly discernible in FIG. 6, initially the piston 4 is inserted such that the sealing lip 22 already contacts the seal protecting section 10 and is compressed to the first diameter. Then the assembly of the stop element 9 and the piston 4 is inserted into the cylinder housing 3, leading to the retention system 17 contacting the receptacle 16, which receptacle 16 therefore forms a type of counter stop area. Subsequently then a lid element 26 is fastened at the cylinder housing 3 such that the stop element 9 is positioned in the cylinder housing 3 via the disk spring 19 in a spring-elastic fashion and protected from getting lost.

In other words, with the master cylinder 1 according to the invention a primary seal 8 is provided, which sits in a parking position on a closed annular area, namely the interior circumferential area 20. This annular area 20 can be placed fixed to the housing/fixed to the cylinder housing or floating on a stop element 9 for referencing/plausibility checking. The stop element 9 is advantageously centered in reference to the hydraulic housing/cylinder housing 3 (via transitional sections 12 in the actuated state). The actual pre-stressing (caused by the disk spring 19) of the stop element 9 ensures the reduction/minimization of a gap between the closed park area/annular area (interior circumferential area 20) and the snifter groove section (equivalent to the transitional section 12). The assembly of the primary seal 8 in the hydraulic housing 3 is simplified, with initially the piston 4 being preassembled in the parking position.

LIST OF REFERENCE CHARACTERS

1 master cylinder
2 pressure cylinder section
3 cylinder housing
4 piston
5 sealing device
6 pressure chamber
7 restraint system
8 seal
9 stop element
10 seal protecting section
11 connection 12 transitional section
13 internal circumferential side
14 radial groove
15 connection groove
16 receptacle
17 retention system
18 first step
19 disk spring
20 internal circumferential area
21 second step
22 sealing lip
23 base section
24 compensation opening
25 reference stop
26 lid element

The invention claimed is:

1. A master cylinder for an actuating device of a clutch or a brake of a motor vehicle, comprising a cylinder housing with a pressure cylinder section, a piston supported in a manner displaceable in reference to the cylinder housing, a sealing device connected to the piston, with the piston in an actuated state being arranged inside the pressure cylinder section in order to control a fluidic pressure in a pressure chamber sealed fluidically by the piston via the sealing device, and arranged in a pressureless state such that the pressure cylinder section is fluidically connected to a retention system, the sealing device having a seal that is embodied and fastened to the piston such that at least in a parking position, in the pressureless state, the seal contacts a seal protecting section of a stop element connected to the cylinder housing.

2. The master cylinder according to claim 1, wherein the stop element is a part that is separate from the cylinder housing.

3. The master cylinder according to claim 1, wherein the stop element is a cold formed part.

4. The master cylinder according to claim 1, wherein the seal protecting section is formed at an interior circumferential side of the stop element, with an interior circumferential area that comprises, in proximity to the seal protection area, a first diameter remaining constant along the circumference.

5. The master cylinder according to claim 4, wherein the first diameter of the seal protecting section is greater than a second diameter of the pressure cylinder section.

6. The master cylinder according to claim 5, wherein the cylinder housing comprises a transitional section, in an axial direction conically expanding from the stop element away from the pressure cylinder section and comprises several radial grooves connected to the retention system.

7. The master cylinder section according to claim 1, wherein the seal is annular with a sealing lip of the seal being embodied such that it contacts the seal protecting section as well as the pressure cylinder section.

8. The master cylinder according to claim 1, wherein the stop element comprises a clamp-shaped holding section at a radial exterior side, which in an operating state is inserted in a receptacle of the cylinder housing in a radially fixed, but axially displaceable fashion.

9. The master cylinder according to claim 1, wherein the stop element is pre-stressed by a disk spring in a direction of the pressure cylinder section.

10. A method for the assembly of the master cylinder according to claim 1, comprising the following successively performed steps:
   a) inserting the piston into the stop element such that the seal is inserted into the stop element at the seal protecting section.
   b) inserting the stop element with the piston into a receptacle in the cylinder housing until it contacts a contact area of the stop element at a counter stop area of the cylinder housing, and
   c) fastening at least one lid element to the cylinder housing with simultaneously an axial pre-stressing of the stop element in a direction of the pressure cylinder section.

* * * * *